United States Patent
Li et al.

(10) Patent No.: US 9,864,458 B2
(45) Date of Patent: Jan. 9, 2018

(54) TOUCH-CONTROL DISPLAY PANEL

(71) Applicants: Shanghai Tianma Micro-electronics Co., Ltd., Shanghai (CN); Tianma Micro-electronics Co., Ltd., Shenzhen (CN)

(72) Inventors: Gujun Li, Shanghai (CN); Liang Xie, Shanghai (CN); Zhonglan Cai, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 38 days.

(21) Appl. No.: 15/219,151

(22) Filed: Jul. 25, 2016

(65) Prior Publication Data
US 2017/0308221 A1 Oct. 26, 2017

(30) Foreign Application Priority Data
Apr. 25, 2016 (CN) .......................... 2016 1 0260401

(51) Int. Cl.
| | |
|---|---|
| G06F 3/00 | (2006.01) |
| G06F 3/041 | (2006.01) |
| F21V 8/00 | (2006.01) |
| G06F 3/044 | (2006.01) |
| G06F 3/045 | (2006.01) |
| G06F 3/047 | (2006.01) |

(52) U.S. Cl.
CPC ......... *G06F 3/0416* (2013.01); *G02B 6/0051* (2013.01); *G02B 6/0055* (2013.01); *G06F 3/044* (2013.01); *G06F 3/045* (2013.01); *G06F 3/047* (2013.01); *G06F 3/0412* (2013.01); *G06F 3/0414* (2013.01); *G06F 2203/04111* (2013.01)

(58) Field of Classification Search
CPC ...... G06F 3/044; G06F 3/0412; G06F 3/0416; G06F 3/0414; G06F 3/045; G06F 3/047; G06F 2203/04111; G02B 6/0051; G02B 6/0055

See application file for complete search history.

(56) References Cited

U.S. PATENT DOCUMENTS

| | | | |
|---|---|---|---|
| 2012/0200546 A1* | 8/2012 | Miyamoto et al. | ...... H01L 27/14623 345/205 |
| 2013/0016059 A1 | 1/2013 | Lowles et al. | |
| 2015/0331517 A1 | 11/2015 | Filiz et al. | |
| 2017/0123538 A1* | 5/2017 | Kuo | ...... G06F 3/0412 |

* cited by examiner

*Primary Examiner* — Muhammad N Edun
(74) *Attorney, Agent, or Firm* — Anova Law Group, PLLC

(57) ABSTRACT

A touch-control display panel with integrated force touch function is provided. The touch-control display panel includes a first substrate and a second substrate arranged in opposite to the first substrate; a semiconductor layer having a plurality of active regions; and a light-shielding metal layer sandwiched between the first substrate and the semiconductor layer. The light-shielding metal layer has a first region and a second region isolated from the first region. A vertical projection of the first region on the first substrate is equal to or larger than a vertical projection of the active regions on the first substrate, and the second region contains a plurality of first force sensing electrodes.

19 Claims, 12 Drawing Sheets

TOUCH-CONTROL DISPLAY PANEL

CROSS-REFERENCES TO RELATED APPLICATIONS

This application claims priority of Chinese Patent Application No. 201610260401.X, filed on Apr. 25, 2016, the entire contents of which are hereby incorporated by reference.

FIELD OF THE INVENTION

The present disclosure generally relates to the field of display technology and, more particularly, relates to a touch-control display panel with integrated force touch function.

BACKGROUND

In recent years, with the development of display technology, as information input devices, display panels with a touch control function are widely applied in various display products, including cell phones, tablets, and GPS, etc. By touching an icon on the display panel using a finger, users can operate the electronic device, thus eliminating the dependence of users on input devices like keyboards and mice, making human-computer interaction more convenient. To further enrich the user experience and meet different user requirements, it is required that the display panels not only are able to collect information regarding a touch location, but also run different operational instructions based on different amount of force or pressure applied on the touch location.

Current touch-control display panels are often of the embedded type, having certain advantages such as high integration level, thin, and light, etc. Based on current structure for touch location detection, an embedded touch-control display panel often needs to add two layers of force sensing electrodes into the touch-control display panel in order to achieve the force touch requirement. Specifically, as shown in FIG. 1, a touch-control display panel 1 comprises an array substrate 110, a backlight module 130, and an air medium 120 between the array substrate 110 and the backlight module group 130.

A first force sensing electrode 102 is disposed on one side of the array substrate 110 that is close to the backlight module group 130, and a second force sensing electrode 104 is disposed on the side of the backlight module group 130 that is close to the array substrate 110. When a voltage with certain potential difference is applied between the first force sensing electrode 102 and the second force sensing electrode 104, the first force sensing electrode 102, the second force sensing electrode 104, and the air medium 20 together form a capacitor.

Because air is a type of compressible medium, when the applied external touch force changes, the distance between the first force sensing electrode 102 and the second force sensing electrode 104 also changes, so that the capacitance between the first force sensing electrode and the second force sensing electrode changes. Based on the capacitance values, the amount of the touch force can be measured.

However, because such structure of the touch-control display panel 1 may need to add two extra film layers for the force sensing electrodes in order to realize touch force detection, the thickness of the touch-control display panel is increased, affecting the thin and light aspects of the touch-control display panel.

The disclosed device structure are directed to solve one or more problems set forth above and other problems.

BRIEF SUMMARY OF THE DISCLOSURE

One aspect of the present disclosure includes a touch-control display panel. The touch-control display panel includes a first substrate and a second substrate arranged in opposite to the first substrate; a semiconductor layer having a plurality of active regions; and a light-shielding metal layer sandwiched between the first substrate and the semiconductor layer. The light-shielding metal layer has a first region and a second region isolated from the first region. A vertical projection of the first region on the first substrate is equal to or larger than a vertical projection of the active regions on the first substrate, and the second region contains a plurality of first force sensing electrodes.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined or separated under conditions without conflicts.

Figure 1:
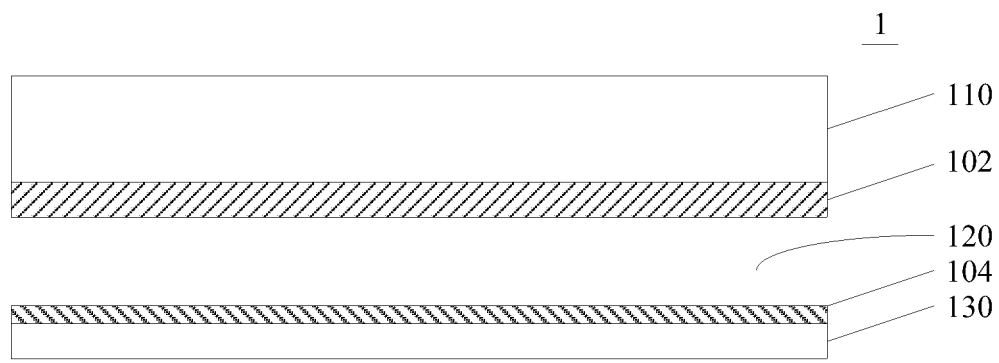
FIG. 1 illustrates a front view of an existing touch-control display panel.
Figure 2:
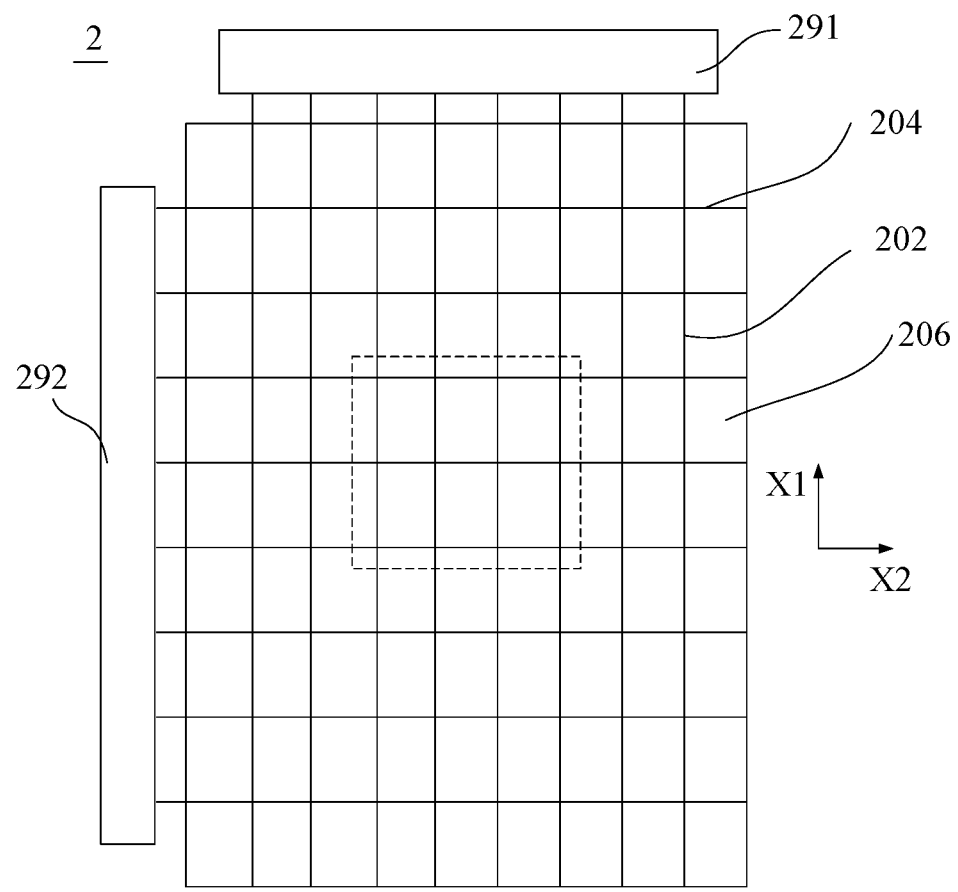
FIG. 2 illustrates an exemplary touch-control display panel consistent with disclosed embodiments.

FIG. 2 illustrates an exemplary touch-control display panel consistent with the disclosed embodiments. As shown in FIG. 2, a touch-control display panel 2 may comprise a plurality of data lines 202 extending along a first direction X1, a plurality of scanning lines 204 extending along a second direction X2, and a plurality of pixel units 206 defined by intersections of the data lines 202 and scanning lines 204.

The data lines 202 may be connected to a data drive unit 291, and the scanning lines 204 may be connected to a gate electrode drive unit 292. In particular, the gate electrode drive unit 292 may switch on the pixel units 206 of a certain row via the scanning lines 204, and the data drive unit 291 may provide data signals to the switched-on pixel units 206 via the data lines 202, thus controlling the image display on the touch-control display panel 2.

Figure 2A:
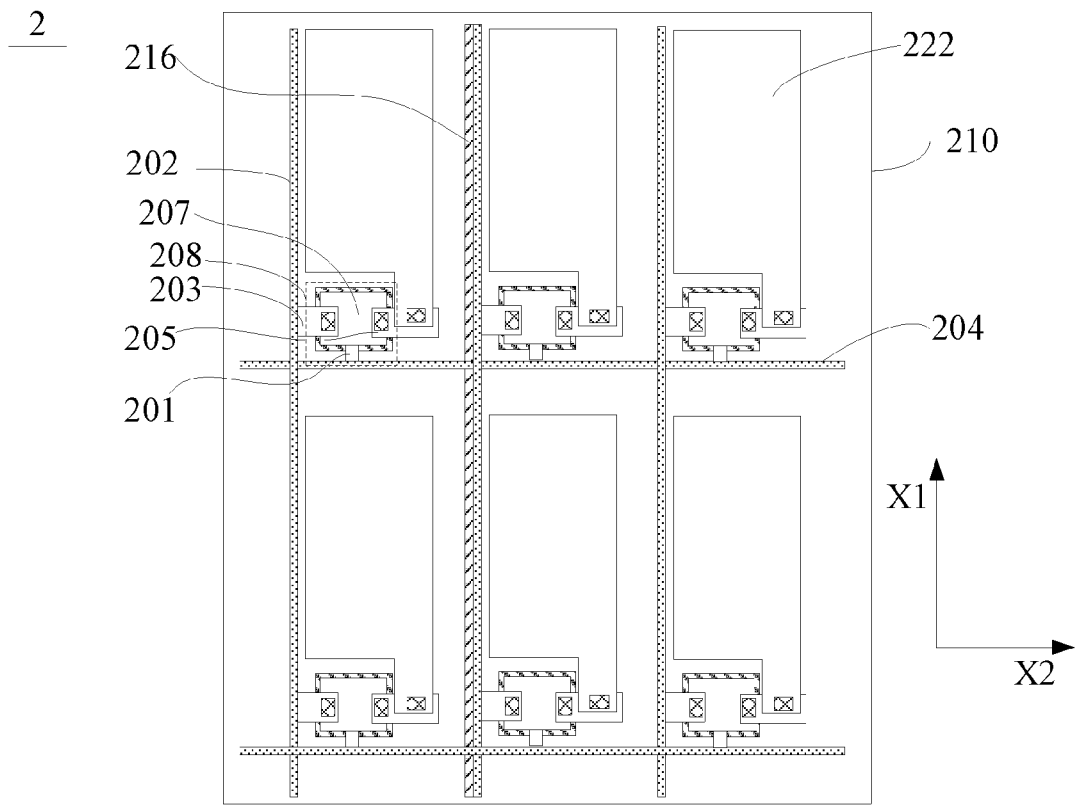
FIG. 2A illustrates an enlarged view of a dashed area in FIG. 2 consistent with disclosed embodiments.

FIG. 2A illustrates an enlarged view of a dashed area in FIG. 2. As shown in FIG. 2A, a pixel electrode 222 may be disposed in each pixel unit 206, and each pixel electrode 222 may be connected to a data line 202 and a scanning line 204 via a switch unit 208. Specifically, the switch unit 208 may include a gate electrode 201, a source electrode 203, a drain electrode 205, and an active region 207. Each switch unit 208 may be connected to the scanning line 204 via the gate electrode 201, the source electrode 203 may be connected to the data line 202, the drain electrode 205 may be connected to a pixel electrode 222 via a through-hole, and the source electrode 203 and the drain electrode 205 may be connected to the active region 207 via through-holes.

When a gate electrode drive unit 292 supplies scanning lines 204 with a select signal, the gate electrode 201 of the switch unit 208 may be switched on, and the data drive unit 291 may transfer data signals to the source electrode 203 of the switched-on switch unit 208 via the data line 202. Because the source electrode 203 and the drain electrode 205 of the switched-on switch unit 208 may form an electrical circuit, when a data signal is transferred to the source electrode 203 of the switch unit 208, the switched-on switch unit 208 may further transfer the data signal to the drain electrode 205. Via the drain electrode 205, the data signal may be further transferred to the pixel electrode 222. The pixel electrode 222 may realize image display according to the corresponding data signals.

Figure 2B:
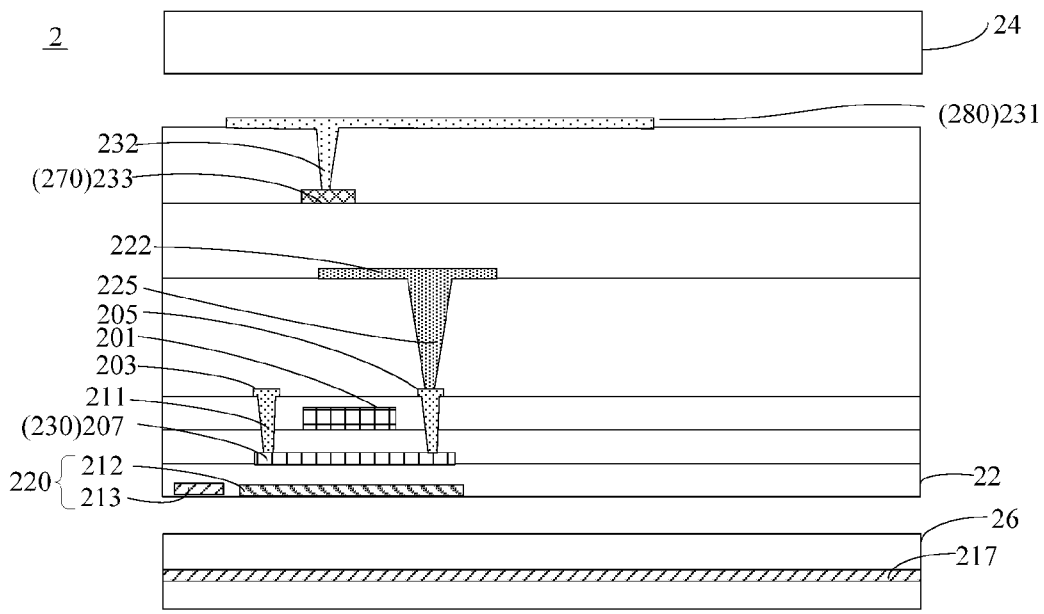
FIG. 2B illustrates a cross-sectional view of a touch-control display panel in FIG. 2 consistent with disclosed embodiments.

FIG. 2B is a cross-sectional view of a touch-control display panel in FIG. 2. As shown in FIG. 2B, the touch-control display panel 2 may include a first substrate 22 and a second substrate 24 arranged face-to-face or in opposite to each other, and a backlight module group 26 may be disposed on one side of the first substrate 22 facing away from the second substrate 24. Further, a light-shielding metal film 220, a semiconductor layer 230, a metal line layer 270, and a touch control electrode layer 280 may be disposed on the first substrate 22.

The light-shielding metal film 220 may include a first region 212 and a second region 213, and the second region 213 may be disposed in isolation of the first region 212. The semiconductor layer 230 may include an active region 207, the metal line layer 270 may include touch control lines 233, and the touch control electrode layer 280 may include touch control electrodes 231.

Further, electroluminescent materials, such as liquid crystal or organic luminescent material, etc., may fill the space between the first substrate 22 and the second substrate 24.

Further, a compressible medium, for instance, air or a polymer dispersed liquid crystal (PDLC) film (e.g., polymer material: polyethylene terephthalate PET, polycarbonate, polymethylmethacrylate, polyimide, or polyethene), may fill the space between the first substrate 22 and the backlight module group 26.

The gate electrode 201 of the touch-control display panel as shown in FIG. 2B may be disposed on top of the active region 207 (on the side close to the second substrate 24), forming a top gate structure. The gate electrode 201 may also be disposed below the active region 207, forming a bottom gate structure.

As shown in FIG. 2B, the source electrode 203 and the drain electrode 205 in the switch unit 208 may be connected to the active region 207 via through-holes 211 to realize the switch on or off of the switch unit 208. The pixel electrode 222 may be connected to the drain electrode 205 via a through-hole 225, thus transferring data signals in the data line 202 to the pixel electrode 222 to control the image display on a touch-control display panel.

Figure 2C:
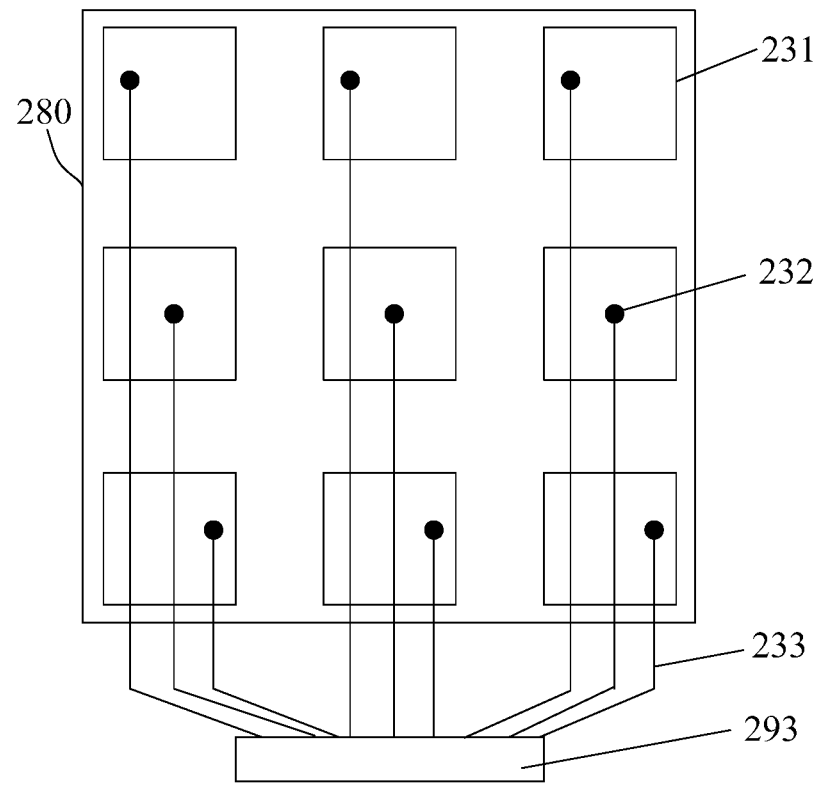
FIG. 2C illustrates exemplary touch control electrodes that realize touch location detection in a touch-control display panel consistent with disclosed embodiments.

FIG. 2C is a top view of touch control electrodes that realize touch location detection in the touch-control display panel illustrated in FIG. 2. As shown in FIG. 2C, a touch control electrode layer 280 may comprise a plurality of touch control block electrodes 231 arranged in an array. Each touch control electrode 231 may be connected to a touch control electrode line 233 via a through-hole 232, and may further be connected to a touch drive unit 293 via the touch control electrode line 233. In operation, the touch control block electrodes 231 may be used as touch control drive electrodes as well as touch control detect electrodes. The touch drive unit 293 may provide a touch drive signal to the touch control electrodes 231 via the touch control electrode line 233. When touched by a finger, the capacitance of the touch control electrode 231 may change, and this change may be detected via the touch control electrode 231 to determine a touch location.

The touch control electrode layer 280 may also be multiplexed as the common electrode layer for the touch-control display panel 2, and the touch control block electrodes 231 may be common block electrodes. The touch control electrode layer 280 may also just be the touch control electrode layer, and the common electrode layer may be separately provided.

The self-capacitive touch display 2 shown in FIG. 2C is only for illustrative purposes and are not intended to limit the scope of the present disclosure when realizing the touch location detection. The touch-control display panel 2 may also be mutual-capacitive to realize the touch location detection.

When the touch-control display panel 2 is a mutual-capacitive touch display to realize the touch location detection, the touch control drive electrodes and touch control detect electrodes may be separately provided, and the touch control drive electrodes and touch detection electrodes may be both disposed on the first substrate 22; or may be both disposed on the second substrate 24. In one embodiment, one of the touch control drive electrodes and touch detection electrodes may be disposed on the first substrate 22, and the other may be disposed on the second substrate 24.

Further, when the touch-control display panel 2 is a mutual-capacitive touch display to realize the touch location detection, the extending directions of the touch control drive electrodes and touch control detect electrodes may be determined based on specific application. For example, the extending direction of the touch control drive electrodes can be parallel to the data lines, and the extending direction of the touch control detect electrodes can be parallel to the scanning lines; or, the extending direction of touch control drive electrodes can be parallel to the scanning lines, and the extending direction of touch control detect electrodes can be parallel to the data lines.

While realizing the touch location detection, the touch-control display panel 2 shown in FIG. 2 may also be integrated with a force touch function. On one hand, the disclosed touch-control display panel may realize the force detection function based on capacitive force touch: the first force sensing electrodes of the capacitive force touch may be disposed on the light-shielding metal film 220, and the second force sensing electrode may be multiplexed with the optical film or electrically conductive unit in the backlight module group 26.

On the other hand, the disclosed touch-control display panel may be based on resistive force touch to realize the force detection function: the force sensing electrodes of the resistive force touch may be disposed on the light-shielding metal film 220. A force sensing electrode may include a first sub-electrode, a second sub-electrode, a third sub-electrode, and a fourth sub-electrode. The first sub-electrode, the second sub-electrode, the third sub-electrode, and the fourth sub-electrode may form at least one Wheatstone bridge.

Figure 3:
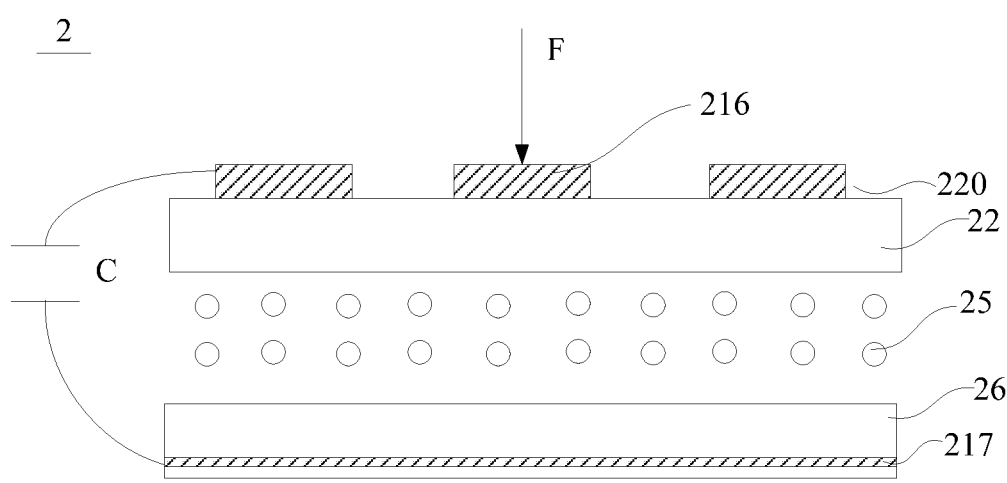
FIG. 3 illustrates a cross-sectional view of an exemplary touch-control display panel based on capacitive force touch consistent with disclosed embodiments.
Figure 3A:
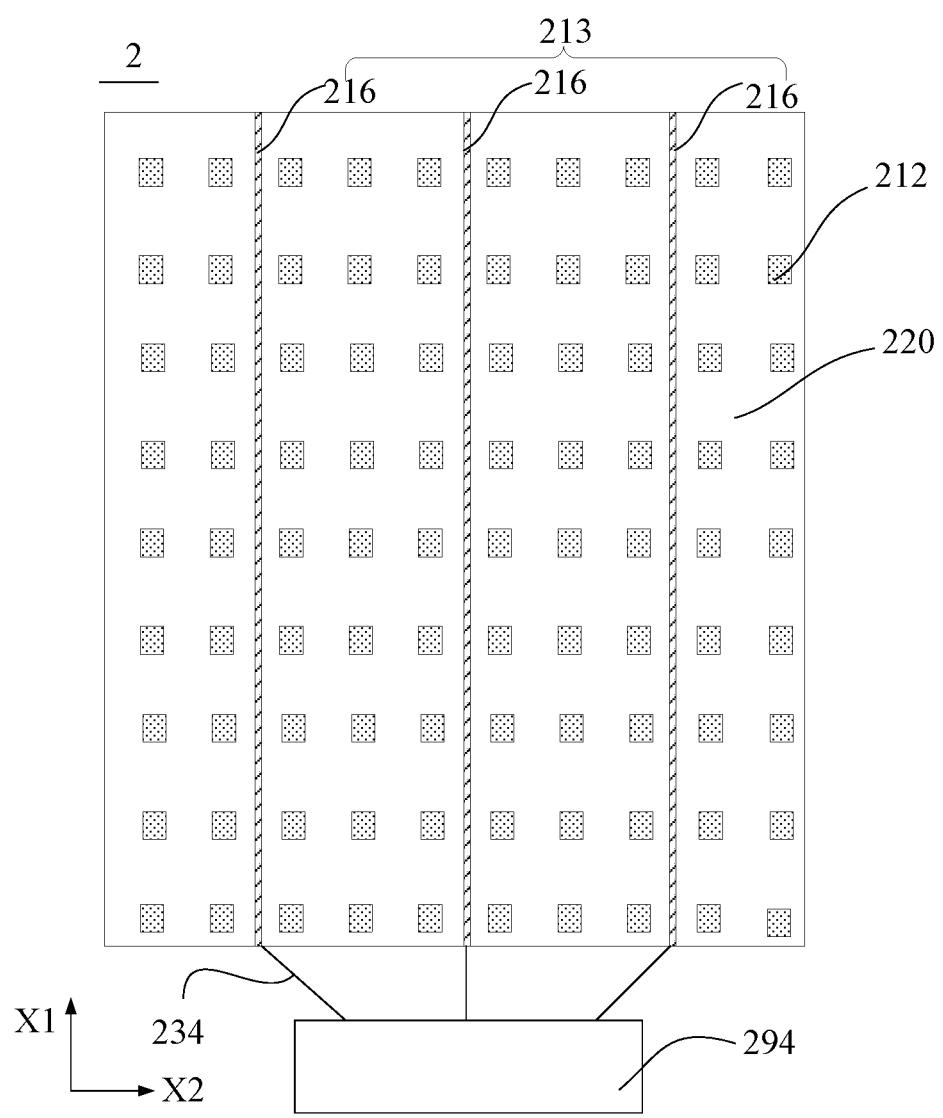
FIG. 3A illustrates an exemplary light-shielding metal film in FIG. 3 consistent with disclosed embodiments.
Figure 3B:
FIG. 3B illustrates a cross-sectional view of an exemplary backlight module group in FIG. 3 consistent with disclosed embodiments.

FIG. 3 illustrates a cross-sectional view of a touch-control display panel based on capacitive force touch. FIG. 3A is a top view of the light-shielding metal film 220 in FIG. 3, and FIG. 3B is a cross-sectional view of the backlight module group 26 in FIG. 3.

As shown in FIG. 3A, the light-shielding metal film 220 may include a plurality of first regions 212, configured to prevent the mitigation rate of the active region 207 from being affected by the light generated at the backlight module group 26. Specifically, the material in the active region 207 may be low-temperature polycrystalline silicone (LTPS). Since LTPS is a light-sensitive material, LTPS may easily generate charge carriers under the light, thus influencing the concentration of charge carriers in the active region.

Accordingly, to avoid the influence of light generated at the backlight module group 26 on the mitigation rate of the active region 207, a light-shielding metal layer 220 may be disposed on the first substrate 22, and a first region 212 may be disposed on locations corresponding to each active region 207 on the light-shielding metal layer 220. To sufficiently avoid the problem of photon-generated carriers in the active region 207, the vertical projection of the first region 212 on the first substrate 22 may be equal to or larger than the vertical projection of the active region 207 on the first substrate 22.

Also shown in FIG. 3A, a second region 213 may be disposed on the light-shielding metal layer 220, and the second region 213 is isolated from the first region 212 to ensure that the first region 212 and the second region 213 are electrically insulated. The second region 213 may include a plurality of the first force sensing electrodes 216 extending along the first direction X1.

As shown in FIG. 3B, the backlight module group 26 may comprise a light source 271, a reflector plate 272, a light guide film 273, a diffuser layer 274, and an anti-reflection film 275. A second force sensing electrode 217 may be disposed on the side of the reflector plate 272 that is close to the first substrate 22. To ensure that light at the reflector 272 is not influenced by the second force sensing electrode 217, the second force sensing electrode 217 may use transparent conductive ITO materials.

Figure 3C:
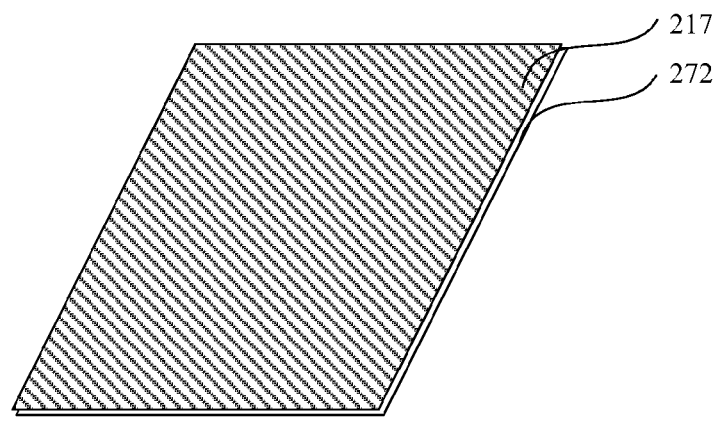
FIG. 3C illustrates an exemplary second force sensing electrode in FIG. 3B consistent with disclosed embodiments.
Figure 3D:
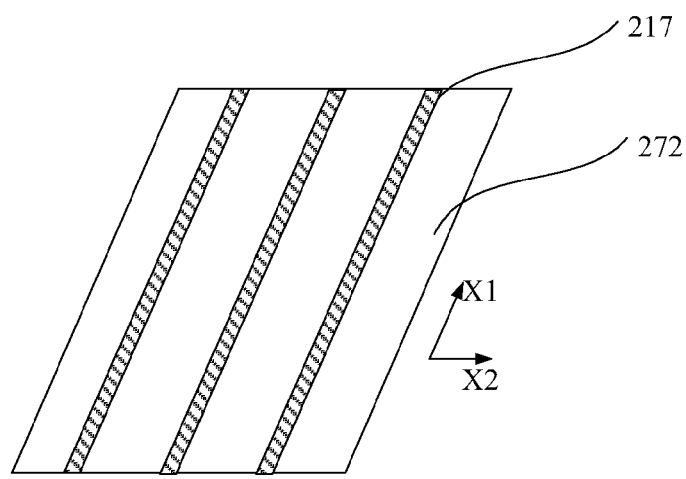
FIG. 3D illustrates another exemplary second force sensing electrode in FIG. 3B consistent with disclosed embodiments.

In one embodiment, the second force sensing electrode 217 may be disposed on the side of the reflector plate 272 that is far from the first substrate 22. The second force sensing electrode 217 may be planar shaped as shown in FIG. 3C, or stripe shaped as shown in FIG. 3D (i.e., a plurality of stripe-shaped electrodes). The extending direction of the second force sensing electrode 217 may be parallel to the first force sensing electrode 216, and the second force sensing electrode 217 may be arranged correspondingly to each first force sensing electrode 216.

The first force sensing electrode 216 may be connected to a force sensing control unit 294 via a first lead line. Specifically, as shown in FIG. 3A, force sensing lead lines 234 may be disposed in the non-display area of the touch-control display panel 2, and each first force sensing electrode 216 may be connected to the force sensing control unit 294 via an individual force sensing lead line 234.

Figure 3E:
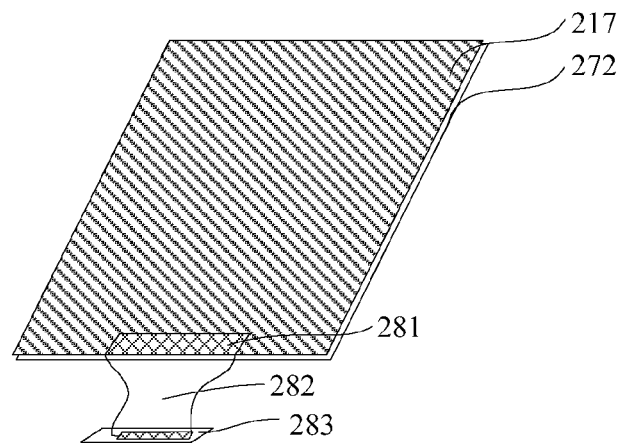
FIG. 3E illustrates an exemplary connection of the second force sensing electrode with an external circuit in FIG. 3C consistent with disclosed embodiments.

In certain embodiments, the second force sensing electrode 217 may be connected to a flexible printed circuit (FPC) via an electrically conductive medium, and may be further connected to an external circuit via FPC. Via the external circuit, a voltage may be supplied to the second force sensing electrode 217. Specifically, as shown in FIG. 3E, one side of the second force sensing electrode 217 that is close to the FPC 282 may be connected to one end of the FPC 282 via an anisotropic conductive adhesive 281, and the other side may be connected to the external circuit 283 via the other end of the FPC 282.

As shown in FIG. 3, when voltages with certain potential difference are applied on the first force sensing electrode 216 and the second force sensing electrode 217, respectively, via the force sensing unit 294 and an external circuit 283, the first force sensing electrode 216, the second force sensing electrode 217, and the filling medium 25 may form a capacitor C. According to the equation: C=εS/d, C's value is inversely proportional to the distance d between the first force sensing electrode 216 and the second force sensing electrode 217.

When the applied external force changes, the distance d between the first force sensing electrode 216 and the second force sensing electrode 217 may also change, and the capacitance C may change accordingly. As a result, by detecting the capacitance C, the force sensing unit 294 may detect the value of the applied external force F, thus realizing the force detection function.

In one embodiment, the force sensing lead lines 234 may be fabricated using the same process and the same material as the first force sensing electrodes 216.

In one embodiment, the force sensing lead lines 234 may be fabricated using the same process and the same material as the data lines 202, and the force sensing lead lines 234 may be connected to the first force sensing electrodes 216 via through-holes.

In one embodiment, the force sensing lead lines 234 may be fabricated using the same process and the same materials as scanning lines 204, and the force sensing lead lines 234 may be connected to the first force sensing electrodes 216 via through-holes.

In one embodiment, the force sensing lead lines 234 may be fabricated using the same process and the same materials as touch control lines 233, and the force sensing lead lines 234 may be connected to the first force sensing electrode 216 via through-holes.

Further, the external circuit 283 may supply a constant voltage signal to the second force sensing electrode 217, or the external circuit 283 may supply a grounding signal to the second force sensing electrode 217.

Figure 4A:
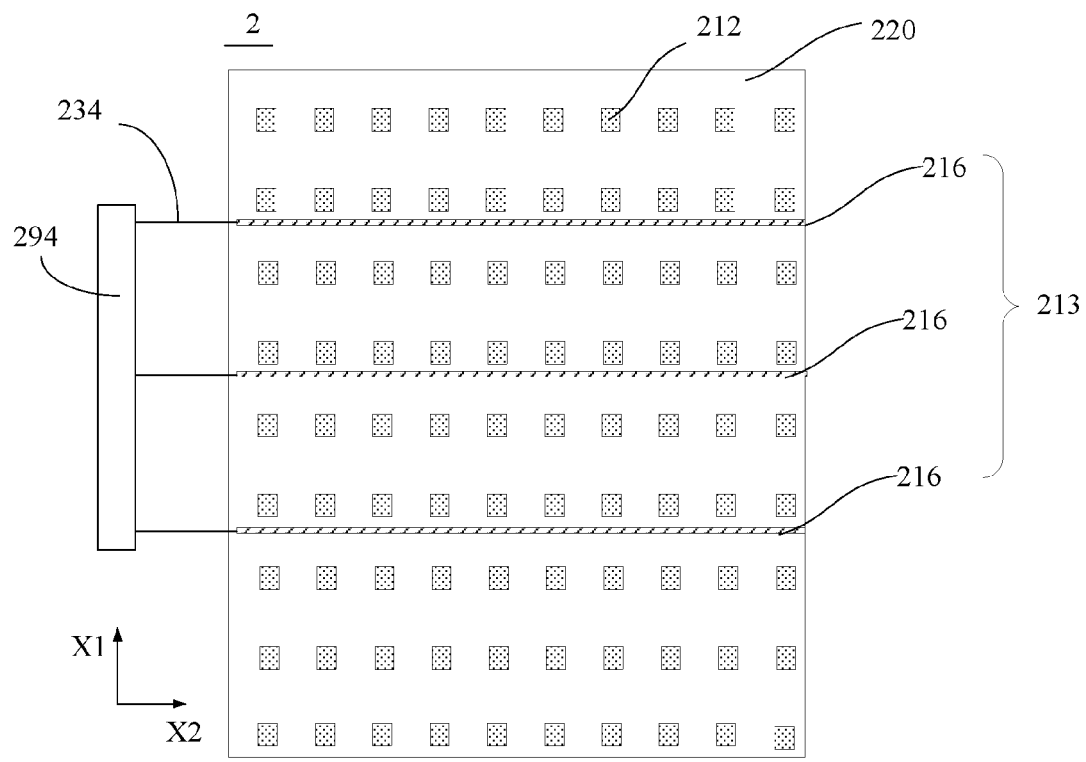
FIG. 4A illustrates an exemplary light-shielding metal film in FIG. 3 consistent with disclosed embodiments.

FIG. 4A is a top view of another light-shielding metal layer 220 in FIG. 3. Compared to the light-shielding metal layer 220 in FIG. 3A, the first force sensing electrodes 216 in FIG. 4A may extend along a second direction X2, and the first force sensing electrode 216 may be connected to the force sensing control unit 294 via the force sensing lead lines 234.

Figure 4B:
FIG. 4B illustrates a cross-sectional view of another exemplary backlight module group in FIG. 3 consistent with disclosed embodiments.

FIG. 4B is a cross-sectional view of another backlight module group 26 in FIG. 3. Compared to the second force sensing electrode as shown in FIG. 3B, the second force sensing electrode 217 in FIG. 4B may be disposed on one side of the light guide film 273 that is close to the first substrate 22.

In one embodiment, the second force sensing electrode 217 may also be disposed on the side of the light guide film 273 that faces away from the first substrate 22. The second force sensing electrode 217 may be planar shaped as shown in FIG. 3C, or may be stripe shaped as shown in FIG. 3D (i.e., a plurality of stripe-shaped force sensing electrodes). Further, a voltage signal may be supplied to the second force sensing electrode 217 via the external circuit 283 similar to the connection shown in FIG. 3E.

Figure 4C:
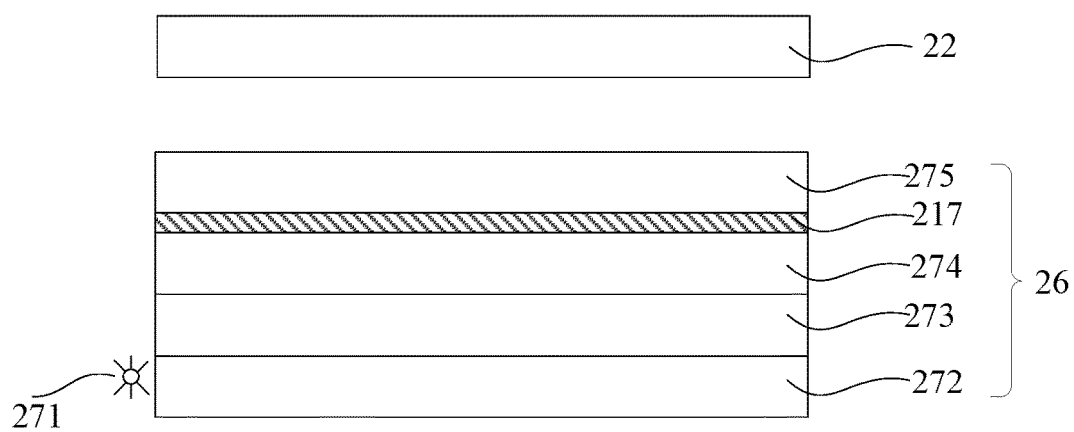
FIG. 4C illustrates a cross-sectional view of another exemplary backlight module group in FIG. 3 consistent with disclosed embodiments.

FIG. 4C is a cross-sectional view of another backlight module group 26 in FIG. 3. Compared to the second force sensing electrode in FIG. 3B, the second force sensing electrode 217 in FIG. 4C may be disposed on one side of the diffuser layer 274 that is close to the first substrate 22.

In one embodiment, the second force sensing electrode 217 may be disposed on the side of the diffuser layer 274 that is far from the first substrate 22. The second force sensing electrode 217 may be planar shaped as shown in FIG. 3C, or may be stripe shaped as shown in FIG. 3D. Further, a voltage signal may be supplied to the second force sensing electrode 217 via the external circuit 283 using similar structure as shown in FIG. 3E.

Figure 4D:
FIG. 4D illustrates a cross-sectional view of another exemplary backlight module group in FIG. 3 consistent with disclosed embodiments.

FIG. 4D is a cross-sectional view of another backlight module group 26 in FIG. 3. Compared to the second force sensing electrode as shown in FIG. 3B, the second force sensing electrode 217 in FIG. 4D may be disposed on one side of an anti-reflection film 275 that is close to the first substrate 22.

In one embodiment, the second force sensing electrode 217 may be disposed on the side of the anti-reflection film 275 that is far from the first substrate 22. The second force sensing electrode 217 may be planar shaped as shown in FIG. 3C, or may be stripe shaped as shown in FIG. 3D. A voltage signal may be supplied to the second force sensing electrode 217 via the external circuit 283 using similar structure shown in FIG. 3E.

Figure 4E:
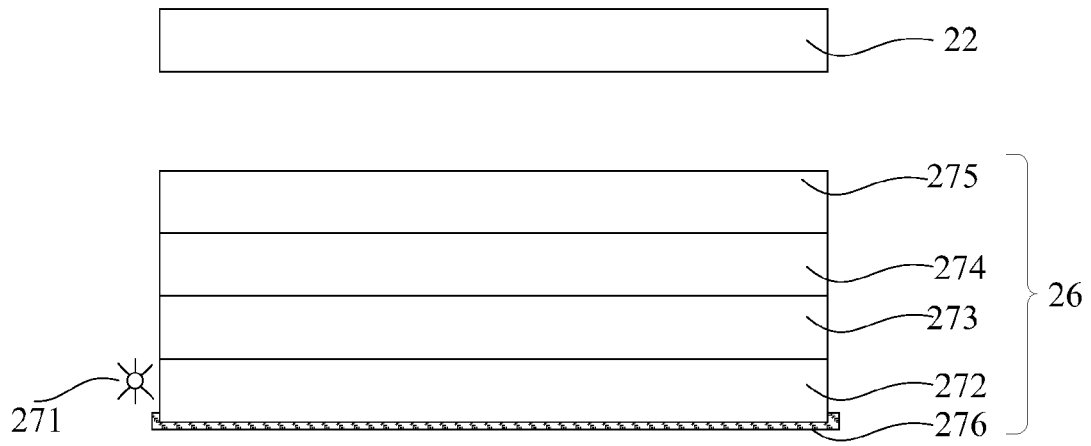
FIG. 4E illustrates a cross-sectional view of another exemplary backlight module group in FIG. 3 consistent with disclosed embodiments.

FIG. 4E is a cross-sectional view of another backlight module group 26 in FIG. 3. Compared to the second force sensing electrode in FIG. 3B, the backlight module group 26 may include a metal frame 276, and the metal frame 276 may be multiplexed as the second force sensing electrode 217. Specifically, when the metal frame 276 is used as the second force sensing electrode 217, the metal frame 276 may be directly connected to the ground, or may supply a voltage signal to the second force sensing electrode 217 via the external circuit 283 using a similar structure shown in FIG. 3E.

Further, the anti-reflection film 275 in the backlight module group 26 may comprise a first anti-reflection film and a second anti-reflection film, and the light emitting direction of the first anti-reflection film may be perpendicular to the light emitting direction of the second anti-reflection film.

Further, the data drive unit 291, the gate electrode drive unit 292, the touch control drive unit 293, the force sensing control unit 294 may be disposed individually and separately, or may be integrated into one drive unit. The external circuit 283 may be the integrated circuit (IC) of the touch-control display panel 2, or may be the main board of a touch display device (i.e., tablet, cell phone) in the touch-control display panel 2.

By multiplexing the light-shielding metal film as the first force sensing electrode layer, and multiplexing the optical film and electrically conductive unit in the backlight module group as the second force sensing electrode layer, the capacitive force touch function of the touch-control display panel can be realized. The disclosed capacitive force touch-control display panel may substantially improve the usage of various films in the current touch-control display panel without introducing two extra film layers for the force sensing electrodes, thus lowering the thickness of the touch control display panel.

Figure 5:
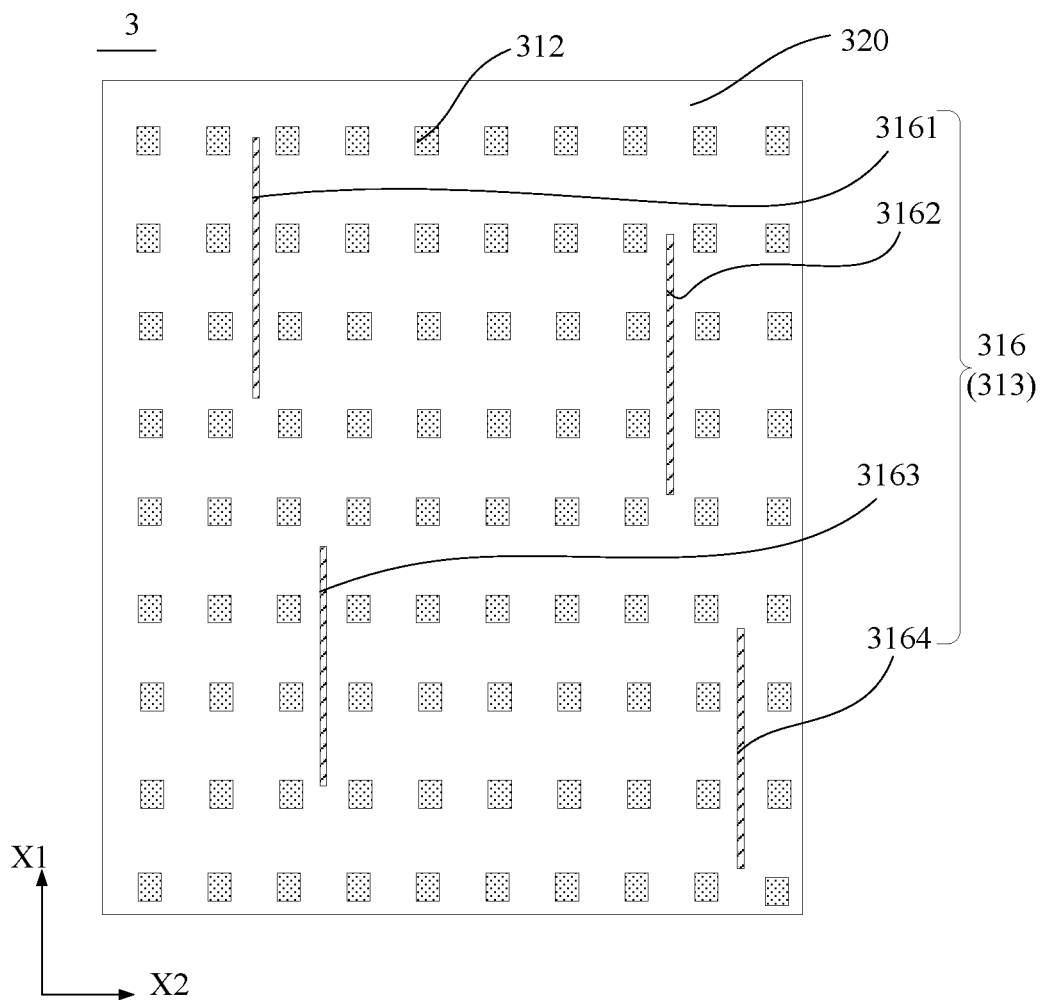
FIG. 5 illustrates an exemplary touch-control display panel based on resistive force touch consistent with disclosed embodiments.

Further, the disclosed touch-control display panel may also realize the force touch function based on resistive force touch. FIG. 5 illustrates an exemplary touch-control display panel based on resistive force touch.

As shown in FIG. 5, a touch-control display panel 3 may comprise a light-shielding metal film 320. The light-shielding metal film 320 may include a plurality of first regions 312, and a plurality of second regions 313 that are isolated from the first regions 312. The second regions 313 may include a plurality of the first force sensing electrodes 316. In particular, a first force sensing electrode 316 may be a stripe-shaped electrode extending in a first direction X1, and may include a first sub-electrode 3161, a second sub-electrode 3162, a third sub-electrode 3163, and a fourth sub-electrode 3164, forming a Wheatstone bridge as shown in FIG. 5A.

The material of the first force sensing electrode 316 may be a strain gauge metal material, whose resistance varies with the degree of deformation. The first force sensing electrode 316 may detect the applied external force by the formed Wheatstone bridge.

Figure 5A:
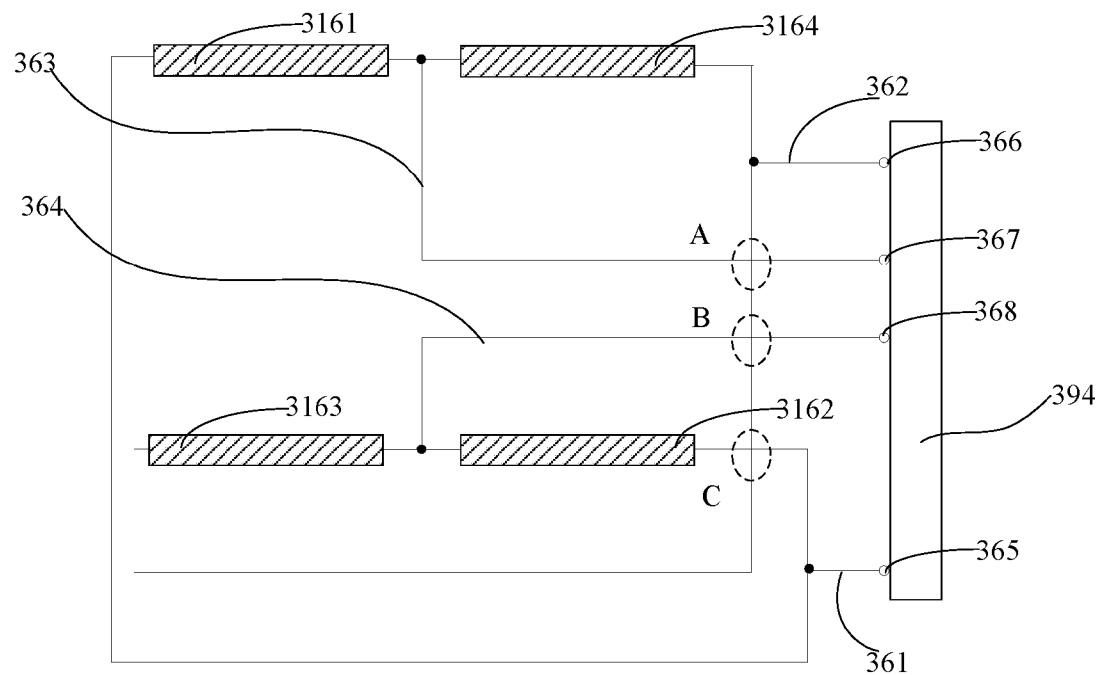
FIG. 5A illustrates an exemplary Wheatstone bridge consists of first force sensing electrodes in FIG. 5 consistent with disclosed embodiments.
Figure 5B:
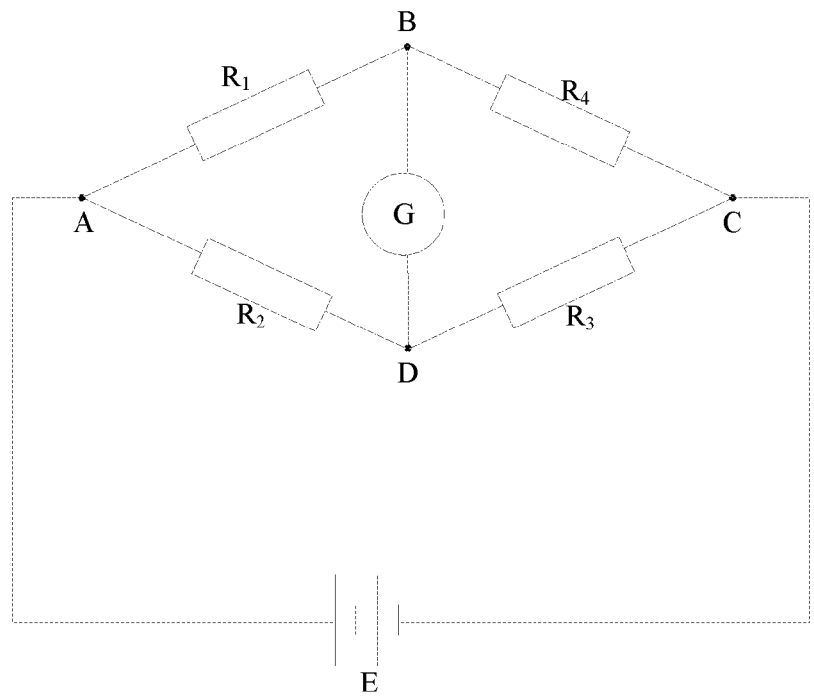
FIG. 5B illustrates an exemplary resistive Wheatstone bridge for a force test consistent with disclosed embodiments.

FIG. 5B illustrates a resistive Wheatstone bridge applied to measure an external force. Four resistors R1, R2, R3, and R4 may form a quadrilateral ABCD, known as four arms of the bridge. A galvanometer may be disposed in the diagonal BD of the quadrilateral ABCD, and the other diagonal AC may be connected to a power source E. When the power source E is switched on, current may flow through every branch of the bridge circuit. When the resistors R1, R2, R3, and R4 satisfy a relationship of R1/R4=R2/R3, the Wheatstone bridge is in a balanced status, and the current of the galvanometer is zero. When the four resistors do not satisfy the relationship of R1/R4=R2/R3, the potentials at B and D may not be equivalent, and the current of the galvanometer is not zero. By utilizing the output value of the galvanometer G, the relationship between the four resistors R1, R2, R3 and R4 may be calculated.

As shown in FIG. 5A, one arm of the disclosed Wheatstone bridge structure may be configured with one first force sensing electrode 316, or two and more first force sensing electrodes 316 connected in series. In FIG. 5A, a first sub-electrode 3161, a second sub-electrode 3162, a third sub-electrode 3163 and a fourth sub-electrode 3164 may form four arms of the Wheatstone bridge, respectively. In particular, the input end of the first sub-electrode 3161 and the input end of the second sub-electrode 3162 may be electrically connected to a first connection wire 361, and may both be electrically connected to the first detect input end 365 via the first connection wire 361.

The signal input end of the third sub-electrode 3163 and the signal input end of the fourth sub-electrode 3164 may both be electrically connected to a second connection wire 362, and may both be electrically connected to the second detect input end 366 via the second connection wire 362. The signal output ends of the first sub-electrode 3161 and the fourth sub-electrode 3164 may be both electrically connected to a third connection wire 363, and may be both electrically connected to a first detect end 367 via the third connection wire 363. The signal output end of the second sub-electrode 3162 and the signal output end of the third sub-electrode 3163 may both be electrically connected to a fourth connection wire 364, and may both be electrically connected to a second detect end 368 via the fourth connection wire 364.

Also referring to FIG. 5, in operation, via the first detect input end 365 and the second detect input end 366, the first sub-electrode 3161, the second sub-electrode 3162, the third sub-electrode 3163, and the fourth sub-electrode 3164 may be supplied with electrical signals. If no external force is applied on the touch-control display panel 3, the Wheatstone bridge is in a balanced status, and the output signal between the first detect end 367 and the second detect output end 368 is zero.

When an external force F is applied on the touch-control display panel 3, the touch-control display panel 3 undergoes deformation, and the resistances of the first sub-electrode 3161, the second sub-electrode 3162, the third sub-electrode 3163, as well as the fourth sub-electrode 3164 change accordingly. At this time, the Wheatstone bridge may lose its balance, the output signal between the first detect output end 367 and the second detect output end 368 may not be zero, and the value of the force F may be obtained by reading and calculating the output signal.

In one embodiment, the first detect input end 365, the second detect input end 366, the first detect output end 375 and the second detect output end 368 may all be connected to the force sensing control unit 394. The first detect input end 365 and the second detect input end 366 may provide input voltage signal via the force sensing control unit 394, while the first detection output end 367 and the second detection output end 368 may supply current signals to the force sensing control unit 394 based on the value of the detected external force.

As shown in FIG. 5A, the first connection wire 361, the second connection wire 362, the third connection wire 363, and the fourth connection wire 364 may have overlapping or intersection regions (Regions A, B, and C in FIG. 5A). The first connection wire 361, the second connection wire 362, the third connection wire 363, and the fourth connection wire 364 may be connected via a bridged connection. For instance, FIG. 5C illustrates a cross-sectional view of a bridged connection method at intersection A.

Figure 5C:
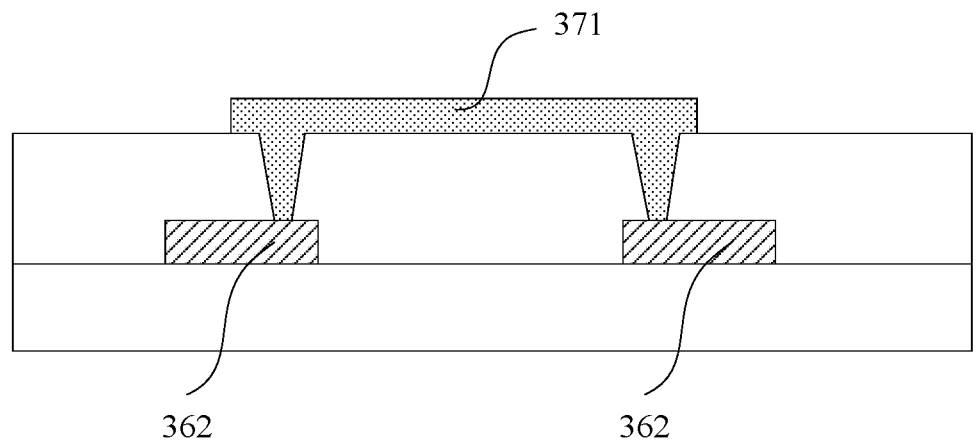
FIG. 5C illustrates an exemplary bridge connection at an intersection A in FIG. 5A consistent with disclosed embodiments.

As shown in FIG. 5C, to avoid a short circuit between the second connection wire 362 and the third connection wire 363 at the intersection A, the third connection wire 363 may be disconnected at the intersection A, and is then connected a bridge conductor 371. In one embodiment, the bridge conductor 371 may be fabricated using the same process and the same material as scanning lines 204. The bridge conductor 371 may also be fabricated using the same process and the same material as data lines 202, or the bridge conductor 371 may be fabricated using the same process and the same material as touch control wires 233.

Figure 6A:
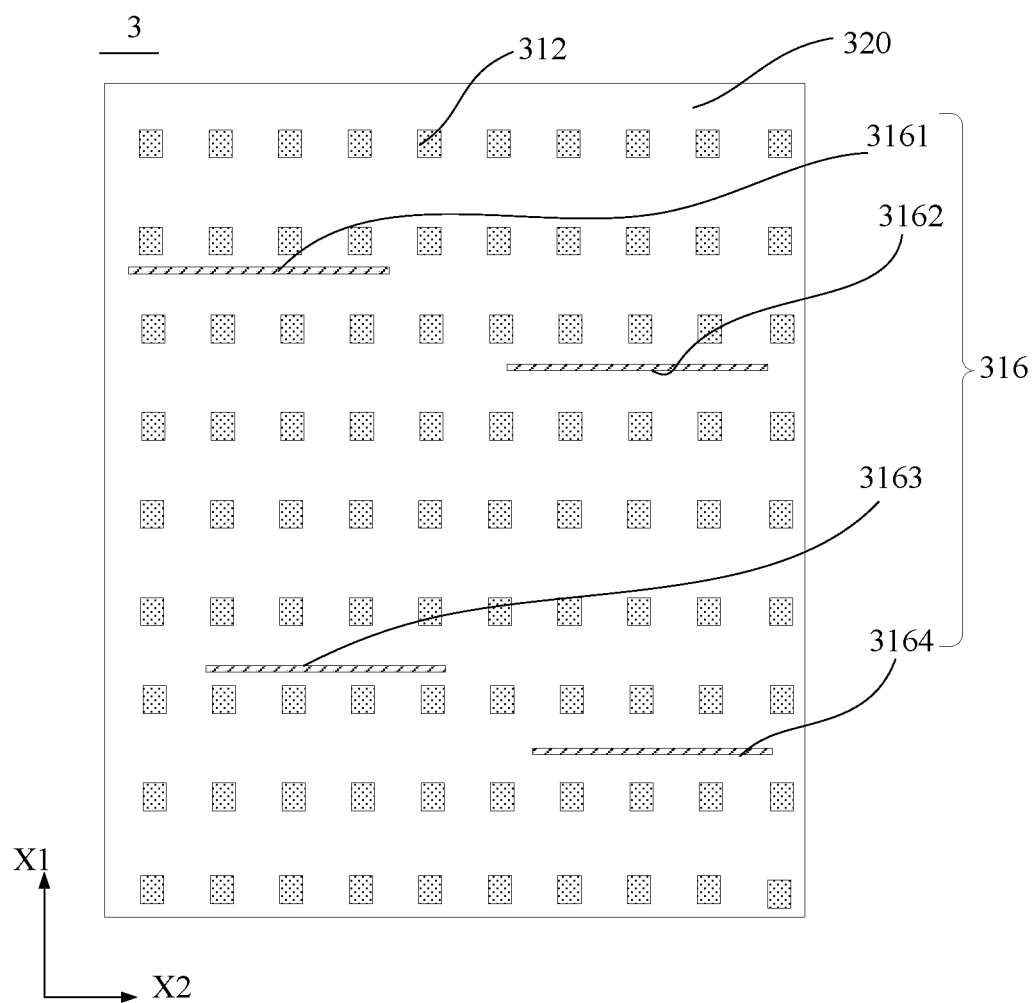
FIG. 6A illustrates another shape of an exemplary first force sensing electrode in FIG. 5 consistent with disclosed embodiments.

Further, optionally, the first force sensing electrodes 316 in FIG. 5 may also extend along the second direction X2. FIG. 6A illustrates such configuration.

As shown in FIG. 6A, the first force sensing electrodes 316 extends along the second direction X2. Although, the touch-control display panel in FIG. 6A uses a different extension direction for the first force sensing electrodes 316 from the touch-control display panel in FIG. 5, other structures and operations may remain the same, detailed descriptions are omitted herein.

Figure 6B:
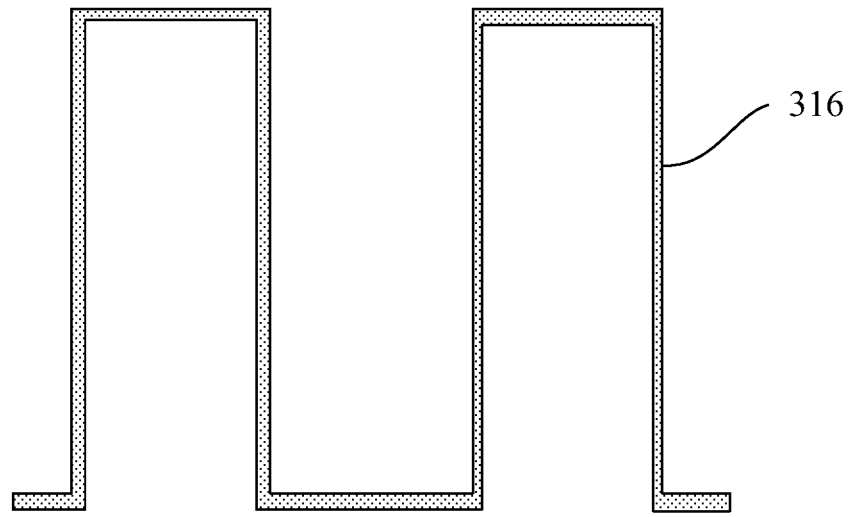
FIG. 6B illustrates another shape of an exemplary first force sensing electrode in FIG. 5 consistent with disclosed embodiments.
Figure 6C:
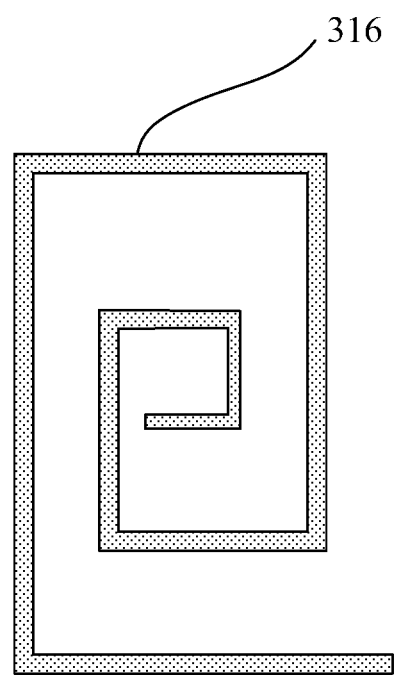
FIG. 6C illustrates another shape of an exemplary first force sensing electrode in FIG. 5 consistent with disclosed embodiments.

Further, the first force sensing electrode 316 in FIG. 5 may also be comb shaped, as shown in FIG. 6B. In other embodiments, the first force sensing electrode 316 may be of a spiral shape, as shown in FIG. 6C.

Further, a black matrix may also be disposed on the second substrate, and the vertical projection of the black matrix on the plane of the first substrate may be equal to or larger than the vertical projection of the first force sensing electrode on the plane of the first substrate.

The embodiments disclosed herein are exemplary only and not limiting the scope of this disclosure. Various combinations, alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A touch-control display panel, comprising:
   a first substrate and a second substrate arranged in opposite to the first substrate;
   a semiconductor layer having a plurality of active regions; and a light-shielding metal layer sandwiched between the first substrate and the semiconductor layer and having a first region and a second region isolated from the first region,
wherein a vertical projection of the first region on the first substrate is equal to or larger than a vertical projection of the active regions on the first substrate, and the second region contains a plurality of first force sensing electrodes.

2. The touch-control display panel according to claim 1, further comprising:
a backlight module group disposed on one side of the first substrate facing away from the second substrate; and
a second force sensing electrode disposed in the backlight module group.

3. The touch-control display panel according to claim 2, further comprising:
a compressible medium layer filled between the backlight module group and the first substrate.

4. The touch-control display panel according to claim 3, wherein:
the backlight module group includes a reflector plate, a light guide film, a diffuser layer, and an anti-reflection film; and
the second force sensing electrode is disposed on any one of the reflector plate, the light guide film, the diffuser layer, and the anti-reflection film that is close to the first substrate or faces away from the first substrate.

5. The touch-control display panel according to claim 4, wherein the second force sensing electrode is made of a transparent ITO material.

6. The touch-control display panel according to claim 5, further comprising:
a flexible printed circuit and an external circuit,
wherein the second force sensing electrode is connected to one end of the flexible printed circuit via an electrically conductive medium, and the other end of the flexible printed circuit is connected to the external circuit.

7. The touch-control display panel according to claim 3, wherein:
the backlight module group includes a metal frame, and
the metal frame is multiplexed as the second force sensing electrode.

8. The touch-control display panel according to claim 7, wherein the metal frame is grounded.

9. The touch-control display panel according to claim 2, wherein:
the first force sensing electrodes are stripe shaped and extend along one of a first direction and a second direction; and
the first direction is perpendicular to the second direction.

10. The touch-control display panel according to claim 1, wherein a resistance of a first force sensing electrode varies with a deformation degree of the first force sensing electrode.

11. The touch-control display panel according to claim 10, wherein:
the first force sensing electrode includes a first sub-electrode, a second sub-electrode, a third sub-electrode, and a fourth sub-electrode; and
the first sub-electrode, the second sub-electrode, the third sub-electrode, and the fourth sub-electrode form at least one Wheatstone bridge.

12. The touch-control display panel according to claim 11, wherein the first sub-electrode, the second sub-electrode, the third sub-electrode, and the fourth sub-electrode are in one of a stripe shape, a comb shape, and a spiral shape.

13. The touch-control display panel according to claim 1, wherein the active regions are made of low-temperature polycrystalline silicon (LTPS).

14. The touch-control display panel according to claim 1, further comprising:
a black matrix disposed on the second substrate,
wherein a vertical projection of the black matrix onto the first substrate is equal to or larger than a vertical projection of the first force sensing electrodes on the first substrate.

15. The touch-control display panel according to claim 1, further comprising:
a non-display region containing a plurality of force sensing lead lines, wherein the force sensing lead lines are connected to the first force sensing electrodes.

16. The touch-control display panel according to claim 1, further comprising:
a touch control electrode layer having a plurality of touch control block electrodes arranged in array.

17. The touch-control display panel according to claim 16, further comprising:
a metal line layer including touch control lines, wherein the touch control lines are connected to the touch control block electrodes.

18. The touch-control display panel according to claim 17, wherein:
the metal line layer further includes a plurality of force sensing lead lines, and
the force sensing lead lines are connected to the first force sensing electrodes.

19. The touch-control display panel according to claim 18, further comprising:
at least one control unit connected to at least one of the force sensing lead lines and the touch control lines.

* * * * *